Dec. 7, 1937. E. O. SARFF 2,101,631
TRACTOR CONSTRUCTION
Filed Feb. 6, 1937
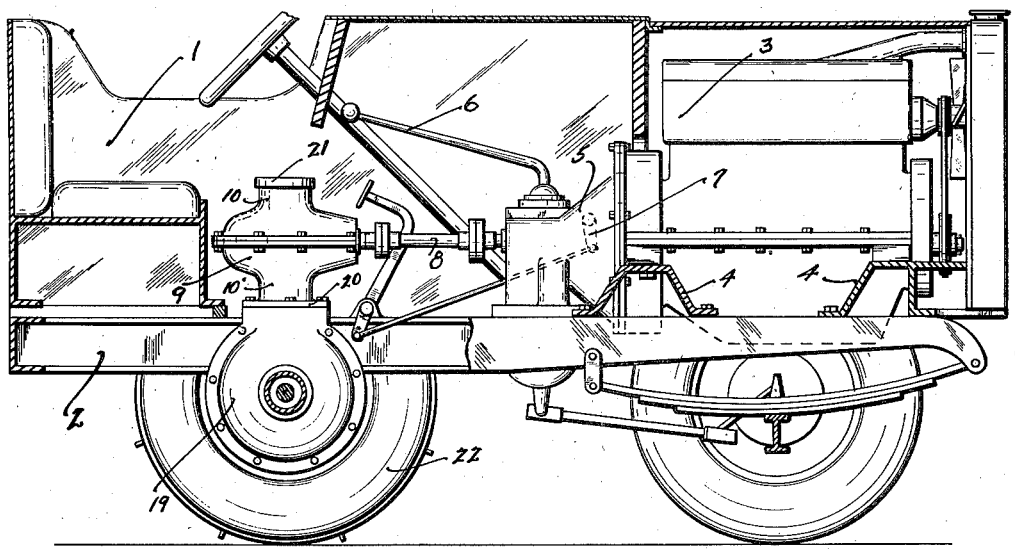
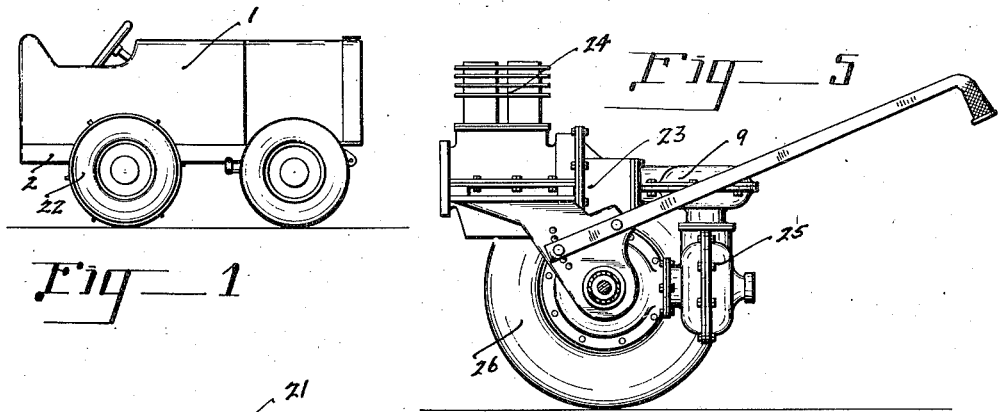
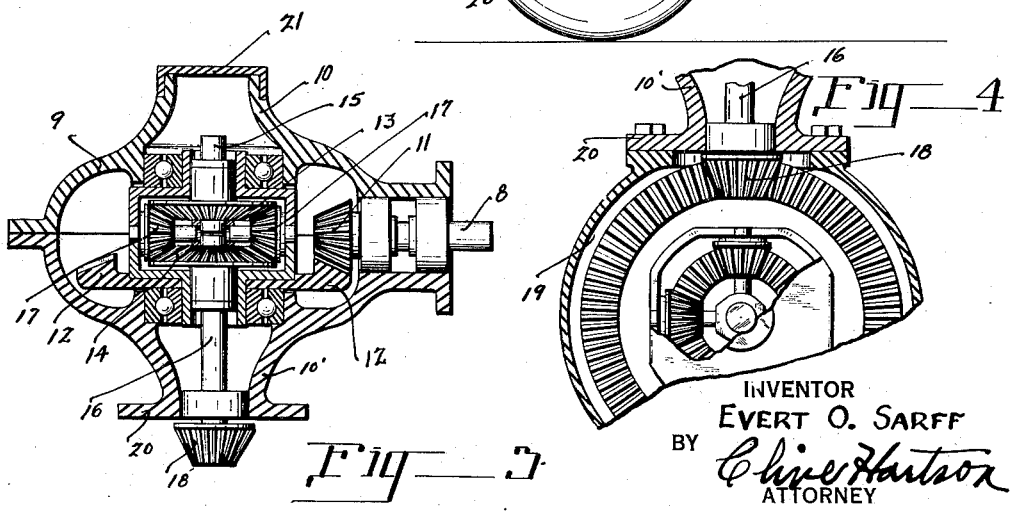
INVENTOR
EVERT O. SARFF
BY
ATTORNEY Patented Dec. 7, 1937

2,101,631

UNITED STATES PATENT OFFICE 2,101,631

TRACTOR CONSTRUCTION

Evert O. Sarff, Roseburg, Oreg.

Application February 6, 1937, Serial No. 124,441

3 Claims. (Cl. 74—417)

My invention relates to tractor construction wherein parts of discarded automotive vehicles are employed in said construction, and especially relates to the utilization of the differential mechanisms of such abandoned or worn out vehicles.

The object of my invention is to provide a tractor construction employing discarded differential mechanisms of power driven vehicles in order to provide for low speed operation, eliminate costs for castings and to reclaim and use otherwise discarded and useless material.

The object of my invention is to employ differential gears, reclaimed from discarded power vehicles in the construction of tractors in order to increase the tractive power of such tractors.

An object of the invention is to utilize other parts of power vehicles in tractor construction, as for instance, the frame, engine, steering gear, etc.

These and additional objects will appear upon reading the description following, aided by the accompanying drawing, wherein:

Figure 1 is a side elevation of the tractor.

Figure 2 is an enlarged side elevation of the tractor with parts removed and in section.

Figure 3 is a horizontal sectional view of a reconstructed rear axle and differential housing which shows changes made in the differential mechanism in order to adapt it to tractor construction.

Figure 4 is a partially sectional view illustrating the connection between the main drive and axle differential.

Figure 5 is a side elevation of a small two-wheel garden tractor employing the teaching of this invention.

Referring to the drawing, the numeral 1 indicates in its entirety a four wheel tractor constructed according to this invention. The tractor consists of the power driven vehicle frame 2 which has been shortened somewhat and retains its original forward wheels. The motor 3 of this vehicle is secured to the frame 2 by means of elevating brackets 4. The motor is provided with a conventional transmission encased in the casing or housing 5 which is provided with a gear shift lever 6, clutch release lever 7, and a drive shaft 8.

Shaft 8 is connected to a reconstructed or reclaimed differential mechanism mounted in housing 9. This housing is a conventional housing having the axle housings 10 and 10' cut off close thereto. Mounted within housing 9 is the usual differential mechanism consisting of the driving gear 11 mounted to the shaft 8, a ring gear 12, side gears 13 and 14 driving respectively axle shafts 15 and 16, and spider gears 17 meshing with gears 15 and 16. Shaft 15 is shortened so that it is concealed within the abbreviated portion of the shaft housing 10 and is further concealed by the addition of the cover 21. The shaft 16 projects from shaft housing 10' and to this is mounted the driving gear 18. In order to provide for positive drive between shaft 8 and shaft 16, the spider gears 17 are welded to the side gears where they mesh. In order to permit mounting of housing 9 to differential housing of tractor 1, housing 10' is provided with a suitable flange 20 for that purpose. Housing 10 is supplied with a suitable cover or cap 21.

Housing 19 houses a differential mechanism similar to that just described with the exceptions that its spider pinions are not welded to the side gears, and the axle shafts and housings are not shortened. To the outer ends of the axle shafts are mounted ground wheels 22 for propelling the vehicle. The housing 19 is turned on the axle shaft axis so that the shaft 16 and pinion 18 enter from above instead of from the front as is the usual practice. Likewise the housing 9 is turned so that the axis of the axle shafts 15 and 16 are vertical.

In view of the fact that ring gear 12 has a larger diameter and circumference than driving pinion 8 it necessarily follows that the speed of shafts 15 and 16 will be less than the speed of shaft 8. This results in increased power at a loss of speed and allows a lower powered high speed automobile engine to be adapted for tractor driving. Thus this permits the alteration of an old automobile into a small tractor. The utilization of such reclaimed differential transmission systems provides an inexpensive way for providing reduction gears not only for tractors as aforesaid but for other power purposes, and in this connection it may be pointed out that such gear systems may be employed for the reverse of that set forth herein. Thus by driving shaft 16 and taking off power from ring gear 12, a speed increasing mechanism is provided.

Figure 5 shows the adaptation of the idea to a small two wheeled orchard tractor 23. In this case the tractor is provided with a small motor 24 which is connected by two of the gear mechanisms herein described, and indicated by housings 9, to the differential mechanism in the differential housing 25. This is a conventional differential mechanism driving axle shafts which in turn drive ground wheels 26.

Having described my invention, I claim:

1. In tractor construction embodying the use of frame, power unit, differential mechanism and ground wheels of old automobiles, a reduction gear system in the transmission line thereof, comprising a differential mechanism having a ring gear driven by the power unit, side gears driving axle shafts, and spider gears meshing with and welded to the side gears.

2. A reduction gear for tractors formed of automobiles, comprising a differential mechanism including axle shafts, shaft housing, differential housing, a ring gear driven by the tractor motive power, side gears and spider pinions meshing with the side gears, the axles and axle housing being shortened, one of the axle shafts being a driving shaft and provided with a pinion meshing with the ring gear of the tractor differential mechanism, the spider pinions of the first differential being welded to the side gears to provide a positive drive of the axle shafts by the ring gear, and means on the axle housing which houses the driving axle shaft for mounting the differential housing to the differential housing of the tractor.

3. A reduction gear formed of a differential mechanism comprising a differential housing having shortened axle shaft housings, a driven ring gear, side gears driven thereby, spider pinions meshing with and welded to the side gears, axle shafts driven by the side gears, one of said shafts being concealed within its axle shaft housing and the other being a driving shaft and projecting beyond the end of its housing, mounting means disposed at the end of its housing, mounting means disposed at the end of the housing which houses the driving axle shaft, and a cap covering the end of the other axle shaft housing.

EVERT O. SARFF.